Figure 1:
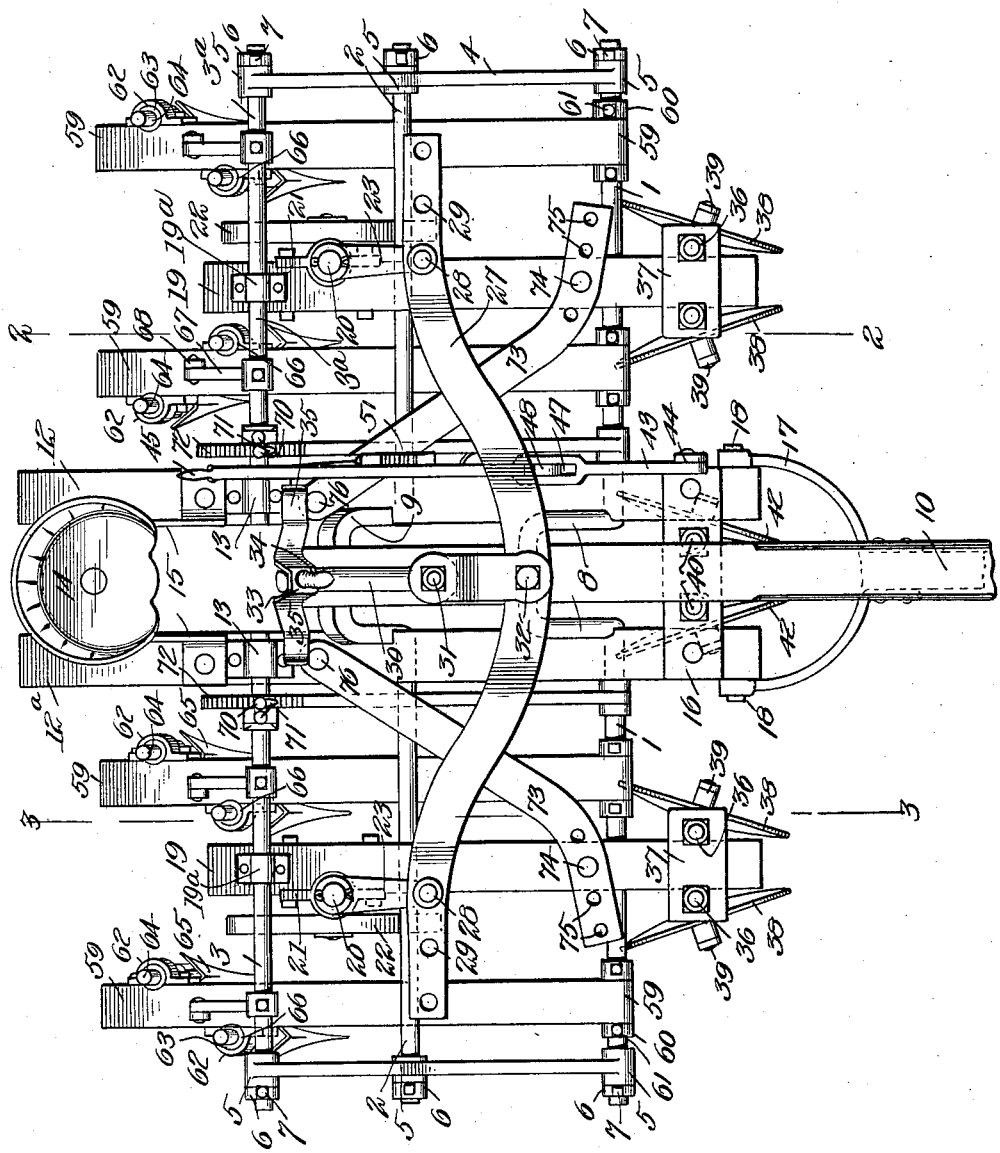

R. HAMILTON.
COTTON CHOPPER.
APPLICATION FILED JULY 13, 1911.

1,031,546.

Patented July 2, 1912.
2 SHEETS—SHEET 1.

WITNESSES
F. C. Barry
C. E. Trainor

INVENTOR
Robert Hamilton
BY Munn & Co.
ATTORNEYS

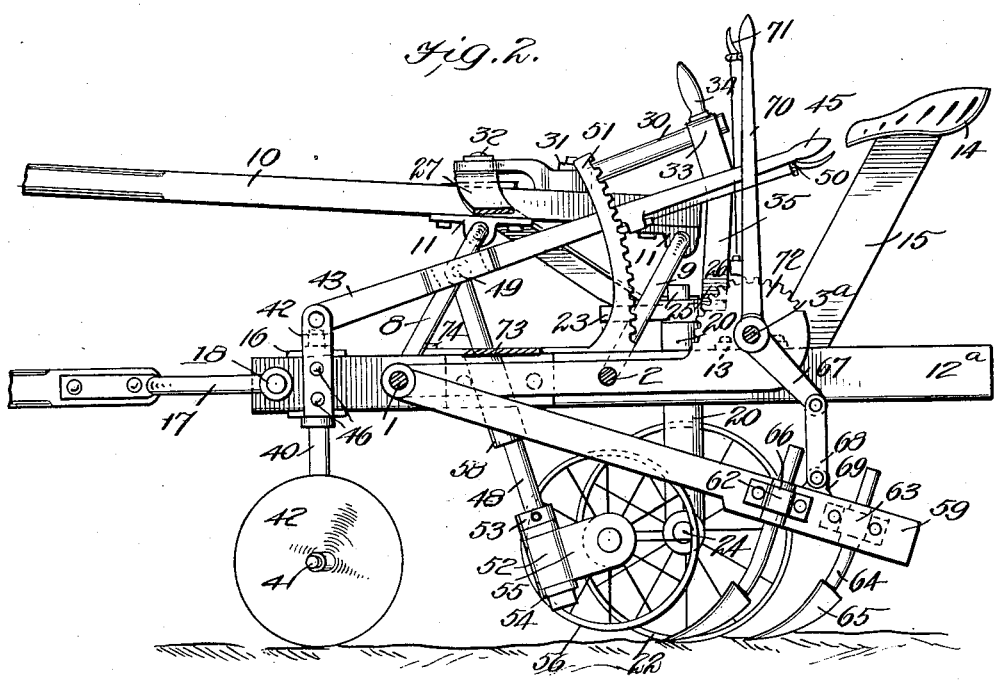

UNITED STATES PATENT OFFICE.

ROBERT HAMILTON, OF PENSACOLA, FLORIDA.

COTTON-CHOPPER.

1,031,546.

Specification of Letters Patent.

Patented July 2, 1912.

Application filed July 13, 1911. Serial No. 638,266.

*To all whom it may concern:*

Be it known that I, ROBERT HAMILTON, a citizen of the United States, and a resident of Pensacola, in the county of Escambia, State of Florida, have invented a new and useful Improvement in Cotton-Choppers, of which the following is a specification.

My invention is an improvement in cotton choppers, and consists in certain novel constructions and combinations of parts hereinafter described and claimed.

In the drawings: Figure 1 is a plan view of the improvement; and Figs. 2 and 3 are sections on the lines 2—2 and 3—3, respectively, of Fig. 1.

The present embodiment of the invention comprises three parallel spaced shafts, a front shaft 1, an intermediate shaft 2, and a rear shaft composed of alined sections 3—3ª spaced apart at their inner ends. The outer ends of the shafts are connected by cheek plates 4, each of which is provided with bearings 5 for receiving the shafts, and the shafts are engaged by collars 6 outside the cheek plates held in position by set-screws 7.

Each of the shafts 1 and 2 is provided with a laterally off-set portion at its center, forming a crank 8 and 9, respectively, and a tongue 10 is provided with bearings 11 on its under face in which the cranks are journaled. A pair of spaced parallel bars 12 and 12ª is arranged transversely of the shafts, one on each side of their transverse centers, the said bars having openings through which the shafts 1 and 2 pass, and the inner ends of the sections 3 and 3ª are journaled in bearings 13 on the said bars. The bars 12 and 12ª extend in front and in rear of the shafts, and a seat 14 is connected to the rear ends of the bars by means of a substantially U-shaped bracket 15. Plates 16 above and below the bars connect the front ends of the bars 12 and 12ª, and a clevis 17 has its ends pivoted to the respective bars by bolts 18.

The cranks 8 and 9 of shafts 1 and 2 are between the bars 12—12ª, and the sectional shaft 3—3ª is at a higher level than shafts 1 and 2. A cross bar 19 is arranged between each plate 4 and the adjacent bar 12 or 12ª, each bar 19 having openings for receiving the shafts and extending in front of shaft 1. The said bars 19 extend beneath the sections 3 and 3ª, and the sections 3 and 3ª are journaled in bearings 19ª on the bars and a standard or post 20 is slidably connected with each bar 19 by means of a bearing 21 on the side of the bar. A wheel 22 is journaled at the lower end of each post, and an arm 23 extends laterally from the upper end. Each wheel is journaled on a pin 24 on the post, and the upper end of the post is reduced at 25 to receive a collar 26 on the arm 23. Each arm is pivoted to the adjacent end of a link 27 by means of a bolt 28 engaging an opening in the arm, and one of a longitudinal series of openings 29 in the end of the link. The link 27 is arched forwardly intermediate its ends, and a lever 30 is pivoted at 31 on the tongue and has one of its ends pivoted to the center of the link at 32. The opposite end of the lever is received in a stirrup 33 and secured thereto. The stirrup is provided with a handle 34 and with laterally extending foot plates 35. A post 36 is arranged at each side of the front end of each bar 19, each post being connected to plates 37 above and below the end of the bar. A disk cutter 38 is journaled at the lower end of each post on a lateral pin 39. A plurality of posts 40 is supported by the plates 16 and each post has a lateral pin 41 at its lower end upon which is journaled a disk cutter 42. A lever 43 is pivoted at one end to the upper end of a shaft 44, bolted to the bar 12ª by bolts 46, and the opposite end of the lever is provided with a grip 45 adjacent to the seat. The lever is provided with a slot 47 intermediate its ends and the upper end of a shaft 48 is received in the slot and is pivoted to the lever by a pin 49. The lever is provided with the usual latch mechanism 50 coöperating with a toothed sector 51 secured to the bar 12 for holding the lever in adjusted position. A sleeve 52 encircles the lower end of the shaft between collars 53 and 54, and the said sleeve is provided with spaced parallel arms 55, between which is journaled a wheel 56 on a pin connecting the ears. The shaft 48 is slidable through a sleeve 58 on the bar 12ª. A hanger bar 59 is arranged on each side of each bar 19, each of the hanger bars being journaled on the shaft 1 at its front end and held in place by collars 60, one on each side of the hanger bar and held in place by a set-screw 61. The rear end of each hanger bar is provided with longitudinally spaced bearings 62 and 63, the bearings being on opposite sides of the bar. The shank 64 of a shovel plow 65 is held in each bearing by means of collars 66, one above and one below the bearing.

Each of the sections 3 and 3ᵃ of the rear shaft is provided with a lateral arm 67 near each of the hanger bars, and a link 68 connects each arm with a lug 69 on the bar. A lever 70 is secured to each section near the bars 12 and 12ᵃ, and each lever is provided with the usual latch mechanism 71 engaging a toothed segment 72 on the adjacent bar 12 or 12ᵃ to hold the shaft sections in position. By releasing the levers, the shaft sections may be oscillated to raise or lower the rear ends of the hanger bars to adjust the shovels toward or from the ground. The front end of each bar 19 is connected with one end of a strap 73 by means of a bolt 74 engaging one of a longitudinal series 75 of openings in the end of the strap. The other end of each strap is connected to the adjacent bar 12 or 12ᵃ at 76 near the shaft 3—3ᵃ, and that portion of the plate having the openings 75 is bent laterally to lie transverse to the bar 19. The wheels 22 may be turned to guide the machine by means of the stirrup, the operator swinging the lever 30. The wheel 56 may be depressed or elevated by means of lever 43 and held in adjusted position by the latch mechanism. Each of the posts 36 40 is provided with a collar 77 below bar 37, and a nut 78 is threaded onto the post above the bar.

I claim:

1. A machine of the character specified, comprising spaced cheek plates, each plate having a bearing at each end and a bearing intermediate its ends, a pair of laterally spaced bars between the cheek plates and substantially parallel therewith, shafts journaled in the registering bearings of the plates and in the bars, the rear shaft being sectional, and the ends of the sections being spaced apart between the bars, the front shaft and the intermediate shaft each having a crank between the bars, a clevis connected to the front ends of the bars, a beam having a bearing for each crank, a cross bar on the shafts between each cheek plate and the adjacent bar, vertical posts at the front ends of the said bars, one of the posts being on each side of the bar, a cutting disk on the lower end of each post, a hanger bar journaled at its front end on the front shaft on each side of the last named bar, cultivating shovels at the rear end of each hanger bar, the sections of the rear shaft having an arm adjacent to each hanger bar, a link connecting each arm to the bar, means for oscillating each section of the shaft, means for holding each shaft in adjusted position, a wheel adjacent to each of the cutter supporting bars, a post on which the wheel is journaled, an arm on the post, a bearing on the bar for the post, a connection between the arms for simultaneously oscillating the posts in the same direction, a vertically movable shaft slidable on one of the first named bars, a wheel on the lower end of the shaft, means for moving the shaft vertically, and means for locking the shaft in adjusted position.

2. A machine of the character specified, comprising spaced cheek plates, each plate having a bearing at each end and a bearing intermediate its ends, a pair of laterally spaced bars between the cheek plates and substantially parallel therewith, shafts journaled in the registering bearings of the plates and in the bars, the rear shaft being sectional, and the ends of the sections being spaced apart between the bars, the front shaft and the intermediate shaft each having a crank between the bars, a clevis connected to the front ends of the bars, a beam having a bearing for each crank, a cross bar on the shafts between each cheek plate and the adjacent bar, vertical posts at the front ends of the said bars, one of the posts being on each side of the bar, a cutting disk on the lower end of each post, a hanger bar journaled at its front end on the front shaft on each side of the last named bar, cultivating shovels at the rear end of each hanger bar, the sections of the rear shaft having an arm adjacent to each hanger bar, a link connecting each arm to the bar, means for oscillating each section of the shaft, means for holding each shaft in adjusted position, a wheel adjacent to each of the cutter supporting bars, a post on which the wheel is journaled, an arm on the post, a bearing on the bar for the post, a connection between the arms for simultaneously oscillating the posts in the same direction, a wheel for supporting the rear of the machine, and means for raising the rear of the machine.

3. A machine of the character specified, comprising spaced cheek plates, each plate having a bearing at each end and a bearing intermediate its ends, a pair of laterally spaced bars between the cheek plates and substantially parallel therewith, shafts journaled in the registering bearings of the plates and in the bars, the rear shaft being sectional, and the ends of the sections being spaced apart between the bars, the front shaft and the intermediate shaft each having a crank between the bars, a clevis connected to the front ends of the bars, a beam having a bearing for each crank, a cross bar on the shafts between each cheek plate and the adjacent bar, vertical posts at the front ends of the said bars, one of the posts being on each side of the bar, a cutting disk on the lower end of each post, a hanger bar journaled at its front end on the front shaft on each side of the last named bar, cultivating shovels at the rear end of each hanger bar, the sections of the rear shaft having an arm adjacent to each hanger bar, a link connecting each arm to the bar, means for oscillating each section of the shaft, means for holding each shaft in adjusted position, a wheel adjacent to each of the cutter supporting bars, a post on which the wheel is journaled, an arm on the post, a bearing on the bar for the post, a connection between the arms for simultaneously oscillating the posts in the same direction.

4. A machine of the character specified, comprising spaced cheek plates, each plate having a bearing at each end and a bearing intermediate its ends, a pair of laterally spaced bars between the cheek plates and substantially parallel therewith, shafts journaled in the registering bearings of the plates and in the bars, the rear shaft being sectional, and the ends of the sections being spaced apart between the bars, the front shaft and the intermediate shaft each having a crank between the bars, a clevis connected to the front ends of the bars, a beam having a bearing for each crank, a cross bar on the shafts between each cheek plate and the adjacent bar, vertical posts at the front ends of the said bars, one of the posts being on each side of the bar, a cutting disk on the lower end of each post, a hanger bar journaled at its front end on the front shaft on each side of the last named bar, cultivating shovels at the rear end of each hanger bar, the sections of the rear shaft having an arm adjacent to each hanger bar, a link connecting each arm to the bar, means for oscillating each section of the shaft, means for holding each shaft in adjusted position, a wheel adjacent to each of the cutter supporting bars, a post on which the wheel is journaled, means for simultaneously moving the wheels to guide the machine, a wheel for supporting the rear of the machine, and means for raising the machine on the wheel.

5. A machine of the character specified, comprising spaced cheek plates, each plate having a bearing at each end and a bearing intermediate its ends, a pair of laterally spaced bars between the cheek plates and substantially parallel therewith, shafts journaled in the registering bearings of the plates and in the bars, the rear shaft being sectional, and the ends of the sections being spaced apart between the bars, the front shaft and the intermediate shaft each having a crank between the bars, a clevis connected to the front ends of the bars, a beam having a bearing for each crank, a cross bar on the shafts between each cheek plate and the adjacent bar, vertical posts at the front ends of the said bars, one of the posts being on each side of the bar, a cutting disk on the lower end of each post, a hanger bar journaled at its front end on the front shaft on each side of the last named bar, cultivating shovels at the rear end of each hanger bar, the sections of the rear shaft having an arm adjacent to each hanger bar, a link connecting each arm to the bar, means for oscillating each section of the shaft, means for holding each shaft in adjusted position, a wheel adjacent to each of the cutter supporting bars, a post on which the wheel is journaled, and means for moving the wheels to guide the machine.

6. A machine of the character specified, comprising spaced cheek plates, each plate having a bearing at each end and a bearing intermediate its ends, a pair of laterally spaced bars between the cheek plates and substantially parallel therewith, shafts journaled in the registering bearings of the plates and in the bars, the rear shaft being sectional, and the ends of the sections being spaced apart between the bars, the front shaft and the intermediate shaft each having a crank between the bars, a clevis connected to the front ends of the bars, a beam having a bearing for each crank, a cross bar on the shafts between each cheek plate and the adjacent bar, vertical posts at the front ends of the said bars, one of the posts being on each side of the bar, a cutting disk on the lower end of each post, a hanger bar journaled at its front end on the front shaft on each side of the last named bar, cultivating shovels at the rear end of each hanger bar, the sections of the rear shaft having an arm adjacent to each hanger bar, a link connecting each arm to the bar, means for oscillating each section of the shaft, means for holding each shaft in adjusted position, and means for supporting and guiding the machine.

7. A machine of the character specified, comprising spaced cheek plates, each plate having a bearing at each end and a bearing intermediate its ends, a pair of laterally spaced bars between the cheek plates and substantially parallel therewith, shafts journaled in the registering bearings of the plates and in the bars, the rear shaft being sectional, and the ends of the sections being spaced apart between the bars, the front shaft and the intermediate shaft each having a crank between the bars, a clevis connected to the front ends of the bars, a beam having a bearing for each crank, a cross bar on the shafts between each cheek plate and the adjacent bar, vertical posts at the front ends of the said bars, one of the posts being on each side of the bar, a cutting disk on the lower end of each post, a hanger bar journaled at its front end on the front shaft on each side of the last named bar, cultivating shovels at the rear end of each hanger bar, the sections of the rear shaft having an arm adjacent to each hanger bar, a link connecting each arm to the bar, means for oscillating each section of the shaft, means for holding each shaft in adjusted position.

8. A machine of the character specified, comprising spaced cheek plates, a shaft journaled in the cheek plates at the front ends thereof, a shaft journaled in the cheek plates intermediate their ends, a shaft at the rear end of each of the cheek plates, the front and intermediate shaft each having a crank at approximately the center thereof, a beam having a bearing for each crank, a cross bar on the shafts near the ends thereof, vertical posts at the front end of each of the said bars, a cutting disk on the lower end of each post, a hanger bar journaled at its front end on the front shaft adjacent to each of the first-named bars, cultivator shovels at the rear of each hanger bar, the rear shaft having an arm adjacent to each hanger bar and connected therewith, and means for oscillating the shaft to raise and lower the bars.

ROBERT HAMILTON.

Witnesses:
W. S. LURTON,
D. A. NEE.

---

Copies of this patent may be obtained for five cents each, by addressing the "Commissioner of Patents, Washington, D. C."